US006613299B2

(12) United States Patent
Dang et al.

(10) Patent No.: US 6,613,299 B2
(45) Date of Patent: Sep. 2, 2003

(54) CATALYZED DIESEL PARTICULATE MATTER EXHAUST FILTER

(75) Inventors: Zhongyuan Dang, Canton, MA (US); Yinyan Huang, Framingham, MA (US); Amiram Bar-Ilan, Brookline, MA (US)

(73) Assignee: Sud-Chemie Prototech, Inc., Needham, MA (US)

( * ) Notice: Subject to any disclaimer, the term of this patent is extended or adjusted under 35 U.S.C. 154(b) by 127 days.

(21) Appl. No.: 10/008,142

(22) Filed: Nov. 13, 2001

(65) Prior Publication Data

US 2003/0091481 A1 May 15, 2003

(51) Int. Cl.$^7$ ................................................ B01J 28/00
(52) U.S. Cl. .................... 423/239.1; 502/340; 502/339; 502/353; 502/328; 423/212; 423/213.5
(58) Field of Search ................................. 502/340, 353, 502/325, 326, 333, 334, 339, 347, 328; 423/239.1, 212, 213.5

(56) References Cited

U.S. PATENT DOCUMENTS

| | | |
|---|---|---|
| 3,223,653 A | 12/1965 | Stiles |
| 3,257,163 A | 6/1966 | Stiles |
| 4,096,184 A * | 6/1978 | Nakamura et al. .......... 564/127 |
| 4,477,417 A | 10/1984 | Domesle et al. |
| 4,510,265 A | 4/1985 | Hartwig |
| 4,515,758 A | 5/1985 | Domesle et al. |
| 4,588,707 A | 5/1986 | Domesle et al. |
| 4,617,289 A | 10/1986 | Saito et al. |
| 4,711,870 A | 12/1987 | Yamada et al. |
| 4,752,460 A * | 6/1988 | Herren .................... 423/594.7 |
| 4,759,918 A | 7/1988 | Homeier et al. |
| 4,828,807 A | 5/1989 | Domesle et al. |
| 4,900,517 A | 2/1990 | Domesle et al. |
| 4,902,487 A | 2/1990 | Cooper et al. |
| 4,920,087 A * | 4/1990 | Wormsbecher ............... 502/68 |
| 5,000,929 A | 3/1991 | Horiuchi et al. |
| 5,021,145 A * | 6/1991 | Chapple .................. 208/120.1 |
| 5,100,632 A | 3/1992 | Dettling et al. |
| 5,157,007 A | 10/1992 | Domesle et al. |
| 5,213,781 A | 5/1993 | Abe et al. |
| 5,294,411 A | 3/1994 | Breuer et al. |
| 5,330,945 A | 7/1994 | Beckmeyer et al. |
| 5,340,548 A | 8/1994 | Abe et al. |
| RE35,166 E * | 3/1996 | Chapple .................. 208/120.1 |
| 5,514,354 A | 5/1996 | Domesle et al. |
| 5,746,989 A | 5/1998 | Murachi et al. |
| 5,884,474 A | 3/1999 | Topsoe |
| 5,911,961 A | 6/1999 | Horiuchi et al. |
| 6,013,599 A | 1/2000 | Manson |
| 6,355,093 B1 * | 3/2002 | Schwartz et al. ............... 95/56 |

* cited by examiner

*Primary Examiner*—Tom Dunn
*Assistant Examiner*—Colleen P. Cooke
(74) *Attorney, Agent, or Firm*—Scott R. Cox

(57) ABSTRACT

A catalyzed diesel particulate matter exhaust filter including a porous filter substrate for filtering the diesel particulate matter impregnated with a catalytic material which includes an alkaline earth metal vanadate and a precious metal.

22 Claims, 2 Drawing Sheets

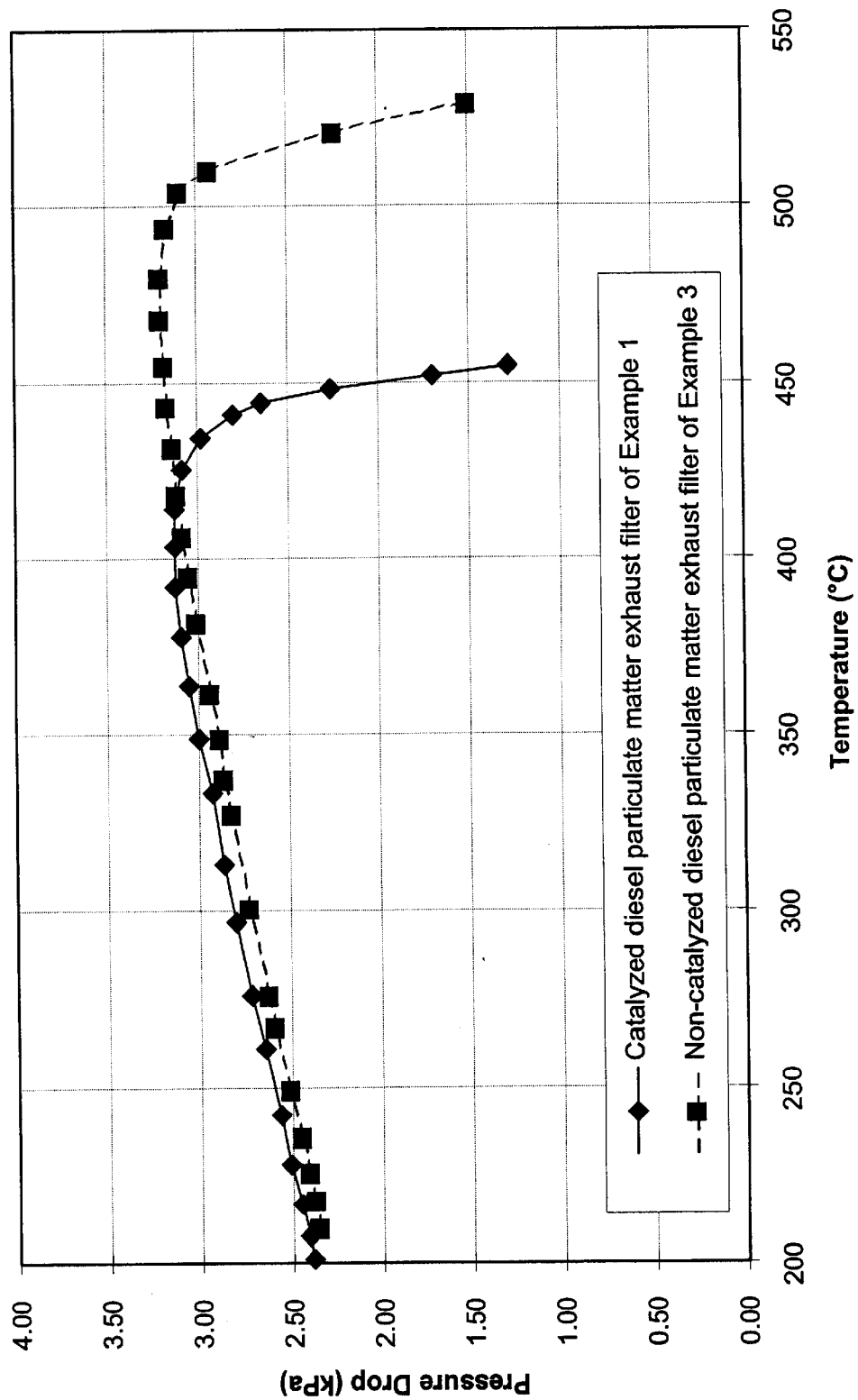
Figure 1. Diesel Particulate Matter Combustion

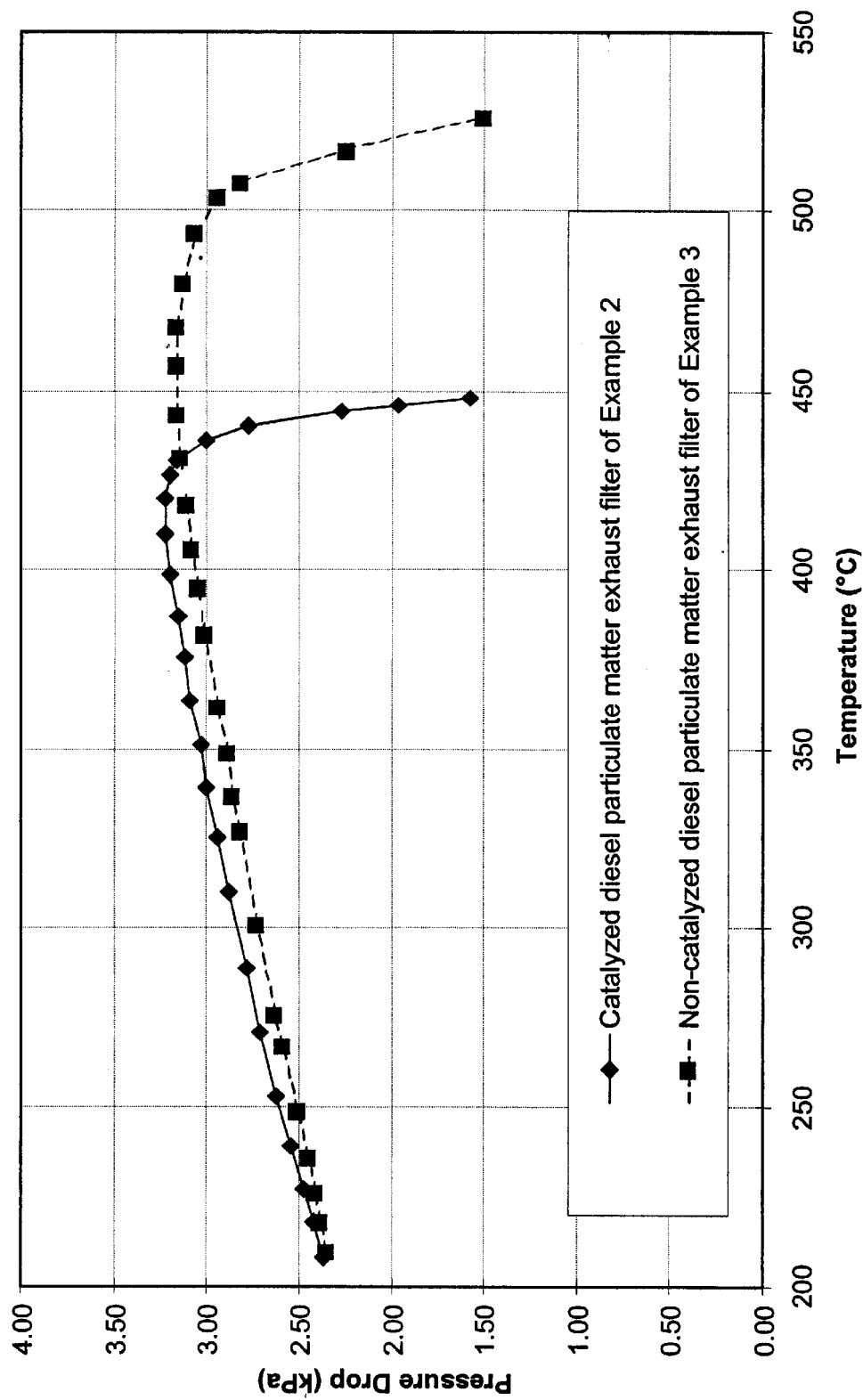

CATALYZED DIESEL PARTICULATE MATTER EXHAUST FILTER

RELATED APPLICATIONS

None.

BACKGROUND OF INVENTION

1. Field of Invention

This invention relates to catalyzed diesel particulate matter exhaust filters and more particularly to a catalyzed diesel particulate exhaust filter which includes a porous filter substrate and a catalytic material, wherein the catalytic material is comprised of an alkaline earth metal vanadate and a precious metal. The invention also includes a process of manufacture of the catalyzed exhaust filter and a process of use of that catalyzed exhaust filter.

2. Background Art

Diesel engines, as a result of their operating characteristics, emit very fine particles. The particulate materials are referred to as particulate matter (PM). In addition to the emission of particulate materials, other types of gaseous compounds are also emitted by diesel engines, such as hydrocarbons, sulfur oxides, nitrogen oxides and carbon monoxide.

It is well known in the art to provide diesel engines with exhaust filters which trap particulate materials from exhaust gas streams during engine operation. These filters are generally made of a porous, solid material having a plurality of pores extending therethrough and small cross-sectional sides, such that the filter is permeable to the exhaust gas which flows through the filter and yet capable of restraining most or all of the particulate materials from passing through the filter with the exhaust gas. As the mass of collected particulate materials increases in the filter, the flow rate of the exhaust gas through the filter is gradually impeded, resulting in an increased back pressure within the filter, which results in a reduced engine efficiency. Conventionally, when the back pressure reaches a certain level, the filter is either discarded, if it is a replaceable filter, or removed and regenerated by burning the collected particulate materials off at a temperature in excess of about 600–650° C. so that the filter can be reused. Regeneration of filters in situ can sometimes be accomplished by periodically enriching the air fuel mixture. This enrichment produces a higher exhaust gas temperature. This higher exhaust temperature burns off the particulate materials contained in the filter. The concept of a filter which will regenerate at a temperature lower than 600–650° C. is disclosed in various patents, for example, U.S. Pat. Nos. 5,100,632 and 4,477,417.

The composition of diesel exhaust particulate filters has been the subject of a number of patents. Many of these patents disclose the use of a combination of particular vanadium compounds and a platinum compound which are washcoated onto a support material. The washcoated support material is then heated to secure the washcoat material to the support material. For example, U.S. Pat. No. 6,013,599 discloses a diesel exhaust particulate filter which can be regenerated in situ, which is formed from a porous refractory support material onto which a washcoating is secured, wherein the washcoating in one embodiment is formed by mixing an acidic iron-containing compound and a copper-containing compound, adding an aqueous alkali metal salt solution and an acidic vanadium-containing compound and finally adding to that mixture an alkaline earth metal compound slurry.

U.S. Pat. No. 4,510,265 discloses a coated diesel exhaust particulate filter formed by coating a solution comprising a platinum group metal and a silver vanadate onto a ceramic monolithic support material. A process of manufacture of a catalyst coating for a diesel exhaust particulate filter containing a silver vanadate is also disclosed by U.S. Pat. No. 4,477,417.

Another diesel exhaust particulate filter is disclosed in U.S. Pat. No. 4,588,707 in which a catalytically active substance formed from lithium oxide, copper chloride, a vanadium oxide/alkali metal oxide combination or precious metal materials is coated onto a filter substrate. Another vanadium-based material for coating a filter for the purification of exhaust gases from diesel engines is disclosed in U.S. Pat. No. 4,828,807.

An open cell monolithic catalyst for the purification of diesel exhaust gases, which monolith is coated with oxides containing vanadium and platinum group metals as active components is disclosed in U.S. Pat. No. 5,514,354. See also U.S. Pat. No. 5,157,007.

Another catalyst for purifying diesel exhaust gases containing platinum and vanadium oxide is disclosed in U.S. Pat. No. 4,617,289. See also U.S. Pat. Nos. 5,911,961, 4,902,487, 4,515,758, 5,884,474, 5,746,989 and 4,900,517 for other catalysts for purifying exhaust streams.

Another exhaust gas purifying catalyst comprising copper, vanadium, a precious metal, such as platinum, rhodium or palladium, and a transition metal selected from the group consisting of zirconium, aluminum, nickel, iron, manganese, chromium, zinc, lead or certain other metals coated on a filter substrate is disclosed in U.S. Pat. No. 4,711,870. See also U.S. Pat. No. 4,759,918.

U.S. Pat. No. 5,100,632 discloses another catalyzed diesel exhaust particulate filter comprising a platinum group metal and an alkaline earth metal oxide, preferably magnesium oxide, wherein the materials are impregnated on a monolithic substrate. The use of vanadium is not disclosed.

A method of cleaning nitrogen oxide containing exhaust gases is disclosed in U.S. Pat. No. 5,213,781, wherein a catalyst is supported on a ceramic layer, wherein the catalyst consists essentially of at least one of an alkali metal, copper and vanadium and at least one rare earth element. See also U.S. Pat. No. 5,340,548.

Other diesel exhaust gas purification catalysts are disclosed in U.S. Pat. Nos. 5,000,929, 5,330,945 and 5,294,411.

While these patents disclose a number of different compositions of material for use as filters for diesel particulate matter, there are still significant problems associated with increased pressure drop during use of these filter. Further, the amount of pressure drop may increase dramatically depending upon the catalyst loading of the substrate material. In addition, some of the diesel combustion catalysts do not have good sulfur poison resistance and can be deactivated if the temperature of the exhaust gas is too high.

Accordingly, it is an object of the invention to produce a filter for diesel particulate matter.

It is a further object of the invention to disclose a diesel particulate matter exhaust filter produced from a porous filter substrate which is impregnated with a catalytic material.

It is a further object of the invention to disclose a diesel particulate matter exhaust filter produced from a porous filter substrate impregnated with a catalytic material, wherein the catalytic material comprises an alkaline earth metal vanadate and a precious metal.

It is a further object of the invention to disclose a catalyzed diesel particulate matter exhaust filter produced from a porous filter substrate impregnated with magnesium, calcium and/or barium vanadate and platinum.

It is a further object of the invention to disclose a process for the manufacture of a diesel exhaust filter wherein a porous filter substrate is impregnated with a catalytic material comprising an alkaline earth metal vanadate and a precious metal.

It is a further object of the invention to disclose a process of use of the catalyzed diesel particulate matter exhaust filter, wherein the exhaust filter comprises a porous filter substrate impregnated with a catalytic material comprising an alkaline earth metal vanadate and a precious metal whereby during use there is a reduced back pressure drop and high thermal stability.

These and other objects of the invention will be apparent from the catalyzed diesel particulate matter exhaust filter of the invention and the process of manufacture and process of use of that exhaust filter.

SUMMARY OF INVENTION

The present invention comprises a catalyzed diesel particulate matter exhaust filter comprising a porous filter substrate impregnated with a catalytic material comprising an alkaline earth metal vanadate, preferably a magnesium, calcium or barium vanadate, and a precious metal, preferably platinum.

The invention further comprises a process for forming a diesel particulate matter exhaust filter comprising forming a porous filter substrate and impregnating that substrate with a catalytic material, wherein the catalytic material comprises an alkaline earth metal vanadate, preferably magnesium, calcium or barium vanadate, and a precious metal salt, preferably a platinum salt, which catalytic material is then reduced.

The invention further comprises a method of filtering particulate matter from a diesel exhaust using a diesel exhaust filter comprising passing the diesel exhaust over a diesel exhaust filter comprising a porous filter substrate impregnated with a catalytic material, wherein the catalytic material comprises an alkaline earth metal vanadate, preferably magnesium, calcium or barium vanadate, and a precious metal, preferably platinum.

BRIEF DESCRIPTION OF DRAWINGS

FIG. 1 is a comparison of the regeneration temperature of the catalyzed diesel particulate matter exhaust filter of Example 1 and the comparative particulate matter exhaust filter of Example 3.

FIG. 2 is a comparison of the regeneration temperature of the catalyzed diesel particulate matter exhaust filter of Example 2 and the comparative particulate matter exhaust filter of Example 3.

DETAILED DESCRIPTION OF A PREFERRED EMBODIMENT

This invention relates to a catalyzed diesel particulate matter exhaust filter for use with diesel exhausts. In the practice of the invention, the catalyzed diesel particulate material exhaust filter is placed in a filter housing mounted in an exhaust gas handling system of a diesel engine. The filter and filter housing, along with any other gas line elements which may be present, are placed between the exhaust gas manifold of the engine and the end of the exhaust pipe, which pipe is open to the atmosphere. Preferably, the filter is placed as close as possible to the engine exhaust manifold so that the exhaust gases, which are heated to high temperatures by the exhaust manifold, can be used to burn off filtered particulate matter trapped by the filter and thus continuously regenerate the filter. Placed in the filter housing is the catalyzed diesel particulate matter exhaust filter of the present invention.

The catalyzed diesel particulate matter exhaust filter is comprised of a porous filter substrate for filtering the diesel particulate matter from the exhaust stream, impregnated with a catalytic material. The porous filter substrate is formed from a conventional filtering product, such as a thin, porous, walled honeycomb, monolith or foam structure through which the exhaust gases can pass to be filtered. Preferably, the filter substrate has a significant flow-through capacity so as not to prevent or restrict significantly the flow of exhaust gases through the filter substrate. However, it must also contain sufficiently convoluted passageways to cause the particulate matter which is present in the diesel exhaust gas to drop out of the exhaust gas stream and be retained by the filter substrate.

The filter substrate may be produced, for instance, from conventional filter materials, such as alumina, titania, zirconia, boria, corundum, silica, magnesia, potassium titanate, silica-alumina, silica-zirconia, titania-zirconia, titania-silica, silicon carbide, titania-coated alumina, alumina coated with tungsten oxide, alumina coated with zirconia, ceramic cordierite, mullite and mixtures and combinations thereof. Preferable substrates are formed from ceramic materials and silicon carbide materials.

The porous filter substrate is impregnated with the catalytic material. The catalytic material is preferably formed from a combination of an alkaline earth metal vanadate and a precious metal. While alkali metal vanadates may also be used, alkaline earth metal vanadates are preferred as they have higher thermal stability. In addition, oxides of these preferred alkaline earth metals, if formed during preparation of the alkaline earth metal vanadate, exhibit high thermal stability. Any alkaline earth metal can be combined with vanadium to form the alkaline earth metal vanadate although magnesium, barium or calcium vanadates, are preferred with magnesium vanadate being the most preferred. Where magnesium oxide is utilized with vanadium oxide, the preferred ratio of vanadium oxide to magnesium oxide is from about 1:1 to about 1:10, preferably from about 1:1 to about 1:5.

The second component of the catalytic material is the precious metal. The precious metal is selected from the group consisting of platinum, palladium, rhodium, ruthenium, rhenium and osmium. The preferred precious metals are platinum, palladium and rhodium, with the most preferred being platinum.

The preferred ratio of the platinum to the alkaline earth metal vanadate which is impregnated on the filter substrate is from about 1:1 to about 1:50, preferably from about 1:5 to about 1:20, and most preferably about 1:10, with the ratio measured by weight. In computing this ratio, the weight of the alkaline earth metal and vanadium oxides, if any, are included with the alkaline earth metal vanadates. All measurements are by weight after coating of the filter substrate.

Depositing the catalyst material on the walls of the filter substrate, such as a monolithic ceramic material, a foamed ceramic material or a silicon carbide material, can be carried out in any conventional process. For example, the filter substrate may be impregnated with the catalytic material or the catalytic material may be washcoated onto the filter substrate. The preferred method for depositing the catalytic material on the filter substrate is to impregnate the filter substrate with a catalytic material. In one preferred embodiment for impregnating the filter substrate with the catalytic material, an aqueous solution of salts of the alkaline earth metal and the vanadium are first prepared. The filter substrate is then contacted with the aqueous solution of the alkaline earth metal salt, such as magnesium nitrate or acetate and the vanadium salt, such as vanadium oxalate, ammonium vanadate or vanadium citrate, at a temperature of about 550° C. for about 3 hours. In order to produce magnesium vanadate, the atomic ratio of the vanadium to the magnesium in the solutions is preferably about 2:3. Well known salts of other alkaline earth metals such as calcium or barium, may also be used to produce the alkaline earth metal vanadate.

Once the filter substrate is coated with the alkaline earth metal and vanadium salts, any excess salt solution is drained away and the impregnated filter substrate is dried at a temperature of about 100 to 150° C. for about 2 hours, followed by calcining of the coated filter at a temperature of about 500 to 600° C. for about three hours to secure the magnesium vanadate onto the filter substrate.

Following impregnation of the filter substrate with the alkaline earth metal vanadate, a precious metal salt is then impregnated onto the coated filter substrate. In one preferred embodiment, this is accomplished by bringing the alkaline earth metal vanadate coated filter substrate into contact with an aqueous solution of the precious metal salt. For example, when the precious metal chosen is platinum, one preferred salt solution is platinum sulfite acid. The coated filter element is coated with the precious metal salt solution. It is then dried at a temperature of about 100 to 150° C. and calcined at about 500 to 600° C. for about 3 hours.

Impregnation of the filter substrate with the alkaline earth metal, the vanadium material and the precious metal compound can also be conducted in a one step process. When the filter substrate is impregnated with the appropriate materials in a one step process, the preferred process is to first form an aqueous solution containing an alkaline earth metal salt, a vanadium salt and a precious metal salt. For example, when magnesium is the alkaline earth metal, one preferred salt is magnesium acetate. One preferred vanadium salt for the single step process is vanadium citrate. These two salts are mixed with the platinum compound, such as platinum sulfite acid. The filter substrate is then dipped into the solution of these compounds and any extra liquid is removed by means of a conventional process, such as the use of vacuum suction. The coated filter is then dried at a temperature of about 100 to about 150° degrees for about 2 hours, followed by calcining at a temperature of about 500 to about 600° for about 3 hours to form the coated filter material.

In preparing the catalyzed diesel particulate matter exhaust filter, the catalyst material is preferably present on the filter substrate at an alkaline earth metal vanadate loading of from about 200 to about 1,000 g/ft$^3$ (7.1 to 35.5 g/l), preferably 300 to about 700 g/ft$^3$ (10.7 g/l to about 24.9 g/l) and most preferably about 500 g/ft$^3$ (17.8 g/l) and a precious metal loading of about 20 to about 300 g/ft$^3$ (0.7 to about 10.7 g/l), preferably about 20 to about 100 g/ft$^3$ (0.7 to about 3.6 g/l) and most preferably about 50 g/ft$^3$ (1.8 g/l). The total catalyst material loading on the filter substrate is from about 200 g/ft$^3$ to about 1000 g/ft$^3$ (7.1 to about 35.5 g/l). Preferably the weight ratio of the platinum to the magnesium vanadate is about 1:1 to about 1:50, more preferably from about 1:5 to about 1:20 and most preferably about 1:10.

Many of the prior art exhaust filters for diesel particulate matter use a washcoating process to coat the filter substrate with the active catalyst material. It has been surprisingly discovered that the impregnation method of coating the filter substrate results in reduced back pressure drop as a result of reduced pore blockage. It has also been surprisingly discovered that when the impregnation method of the invention is utilized, there is almost no pressure drop increase with a coating of the catalyst material up to about 500 g/ft$^3$ (17.8 g/l). In comparison, there are pressure drop increases of about 100 percent with catalyst loading of up to about 480 g/ft$^3$ (17.0 g/l) using the washcoating process of U.S. Pat. No. 6,013,599 and about a 260 percent pressure drop increase with a catalyst loading of about 1030 g/ft$^3$ (36 g/l). While not being bound by the particular theory, it is believed that the alkaline earth metal vanadate, such as magnesium vanadate, that is formed usually consists of a combination of magnesium orthovanadate ($Mg_3(VO_4)_2$), magnesium pyrovanadate ($Mg_2V_2O_7$) and magnesium metavanadate ($MgV_2O_6$). These three phases usually coexist and will form in various manner depending on the operating conditions. It has been discovered that magnesium vanadate has high thermal stability. It has also been discovered that the various forms of magnesium vanadate are formed "in situ" on filter surfaces. As a result, the catalyst of the invention has higher dispersion than prior art compositions which leads to reduced back pressure increase.

It has also been surprisingly discovered that when the catalyst material of the invention is utilized, the temperature for effective regeneration of the catalyst is reduced significantly. When uncatalyzed porous filter substrates are regenerated, the light off temperature of the particulate material on the filter substrate is in the range of 500 to 550° C. In contrast, the regeneration of the exhaust filter of the invention takes place at temperatures around 400° C., often as low as 380° C. As the temperature of a typical diesel engine exhaust can reach this temperature during ordinary operations, partial or even complete regeneration of a filter loaded with the catalyst material of the invention can occur during normal operations. A reduction in the temperature of regeneration of this extent is a significant improvement over the prior art.

EXAMPLES

Example 1

The Invention

A Corning cordierite ceramic monolith diesel particulate filter element (EX-80, 5.66 inch diameter and 6 inch length, 200 cells per square inch) was used for preparation of the example. The ceramic monolith element was dipped in 500 ml of an aqueous solution containing 15 g/l of magnesium in the form of magnesium nitrate, 20 g/l of vanadium in the form of vanadyl oxalate. After impregnation, any extra liquid was removed from the filter element by a vacuum suction. Following impregnation, the coated filter element was dried at 125° C. for 2 hours and then calcined at 550° C. for 3 hours. The magnesium vanadate loading was 300 grams per cubic foot (10.6 g/l). After cooling to room temperature, the filter element was dipped in a 500 ml aqueous solution of platinum sulfite acid ($H_4Pt(SO_4)_4$) containing 10 g/l platinum. Extra liquid was removed by vacuum suction. Following impregnation, the coated filter element was dried at 125° C. for 2 hours and calcined at 550° C. for 3 hours. The platinum loading on a by weight basis was 50 grams per cubic foot (1.8 g/l).

A core of the filter element sized with a 1.75 inch (4.4 cm) diameter and 6 inch (15.2 cm) length with a magnesium vanadate loading of 300 g/ft$^3$ (10.6 g/l), and a platinum loading of 50 g/ft$^3$ (1.8 g/l) was removed from the full size element and tested for regeneration.

A Lister-Petter LPA2 0.726 liter 2 cylinder diesel engine was used for testing. The filter core was installed in the exhaust pipe of this engine. The temperature of the exhaust from the exhaust pipe ranged from 160 to 230° C. when the engine was running. After 5 hours the engine was turned off and the filter was inspected. It was cooled and weighed. A total particulate loading of 1.4 grams was obtained.

The filter loaded with particulate matter was then subjected to off-line regeneration. Warm air was used as the external heat source of regeneration and the space velocity was 25000 h$^{-1}$. A pressure drop caused by the filter was monitored with a Dywer 475 digital manometer. The temperature of the warm air was increased by 10° every five minutes. Once the particulate matter was burned off, the temperature of the warm air was held for 2 hours until complete combustion of the particulate matter. Attached FIG. 1 shows the pressure drop profile against filter temperature of the filter of this Example 1 in comparison with a non-catalyzed exhaust filter of Example 3.

The results clearly showed that the pressure drop caused by the particulate-loaded filter increases with temperature and reaches a plateau when the temperature is about 380° C. This indicates that the combustion of the diesel particulate matter occurs at this temperature. When the temperature is about 410° C., the pressure drop decreases abruptly, indicating that substantially all of the particulate matter has been burned off.

Example 2

The Invention

A Corning cordierite ceramic monolith diesel particulate filter element (EX-80, 5.66 inch diameter and 6 inch length, 200 cells per square inch) was used for preparation of the example. An aqueous solution containing 15 g/l of magnesium as magnesium acetate, 20 g/l of vanadium as vanadium citrate and 10 g/l of platinum as platinum sulfite acid was prepared. The diesel particulate filter element was dipped into 500 ml of this solution. Any extra liquid was removed by a vacuum suction. The element was then subjected to drying at 125° C. for 2 hours and calcination to 550° C. for 3 hours. The final catalyst had a nominal platinum loading of 50 g/ft$^3$ and a magnesium vanadate loading at 300 g/ft$^3$. A core filter element sized with a 1.75 inch diameter and a 6 inch length was removed from the full size element and tested for regeneration. The same engine was used to test this filter element as is discussed in Example 1. The filter loaded with particulate matter was then subjected to off-line regeneration. Warm air was used as the external heat sources of regeneration and the space velocity was 2500 H$^{-1}$. The pressure drop caused by the filter was monitored with a Dywer 475 digital manometer. The temperature of the warm air was increased by 10° every five minutes. Once the particulate matter was burned off, the temperature of the warm air was held for 2 hours until complete combustion of the particulate matter. Attached FIG. 2 shows the pressure drop profile against filter temperature of the filter of this Example 2 in comparison with a non-catalyzed exhaust filter of Example 3. The results clearly show that the pressure drop caused by the filter increases with temperature reaching a plateau when the temperature was about 380 to 410° C. This indicates that the combustion of the diesel particulate matter occurs at this temperature. When the temperature was about 410° C., the pressure drop decreases abruptly, indicating that the particulate matter had been burned off.

Example 3

Comparative Example

An uncatalyzed filter media element was prepared in the same manner as in Example 1. When the same tests were run on this uncatalyzed filter media, the burn off temperature of the diesel particulate matter was about 510° C., as shown in FIGS. 1 and 2.

The results clearly show the enhanced performance of the filter coated with the catalytic material of the invention over a filter media element that was not coated with the catalytic material.

It is understood that modification, substitutions, omissions and changes of the specific embodiments may be made without departing from the spirit of the invention. The invention is intended to be encompassed by the following claims.

What is claimed is:

1. A catalyzed diesel particulate matter exhaust filter comprising
    a porous filter substrate for filtering the diesel particulate matter exhaust impregnated with a catalytic material, wherein the catalyst material comprises an alkaline earth metal vanadate and a precious metal.
2. The exhaust filter of claim 1 wherein the precious metal is selected from the group consisting of platinum, rhodium, palladium, ruthenium, rhenium and osmium.
3. The exhaust filter of claim 1 wherein the precious metal comprises platinum.
4. The exhaust filter of claim 1 wherein the alkaline earth metal is selected from the group consisting of calcium, magnesium and barium.
5. The exhaust filter of claim 1 wherein the alkaline earth metal comprises magnesium.
6. The exhaust filter of claim 1 wherein the by weight ratio of the precious metal to the alkaline earth metal vanadate is from about 1:1 to about 1:50.
7. The exhaust filter of claim 1 wherein the by weight ratio of the precious metal to the alkali earth metal is from about 1:5 to about 1:20.
8. The exhaust filter of claim 1 wherein the composition of the porous filter substrate is selected from a group of materials consisting of a ceramic, alumina, titania, zirconia, boria, corundum, silica, magnesia, potassium titanate, silica-zirconia, titania-zirconia, titania-silica, silica-alumina, silicon carbides, titania-coated alumina, alumina coated with tungsten oxide, alumina coated with zirconia cordierite, mullite, and mixtures and combinations thereof.
9. The exhaust filter of claim 1 wherein the porous filter substrate comprises a ceramic material.
10. The exhaust filter of claim 1 wherein the porous filter substrate comprises a silicon carbide.
11. The exhaust filter of claim 1 wherein the quantity of the catalyst material coating the filter substrate is at least about 200 g/ft$^3$ (7.1 g/l).
12. The exhaust filter of claim 1 wherein the quantity of the catalyst material is from about 200 g/ft$^3$ (7.1 g/l) to about 1000 g/ft$^3$ (35.3 g/l).
13. A method of filtering particulate matter from a diesel exhaust using an exhaust filter comprising passing the diesel exhaust through the exhaust filter of claim 1.

14. A process of forming a diesel particulate exhaust filter comprising
    preparing a porous filter substrate,
    impregnating the substrate with a catalytic material comprising an alkaline earth metal vanadate and a precious metal, and
    calcining the impregnated filter substrate to form the exhaust filter.

15. The process of claim 14 wherein the precious metal is selected from the group consisting of platinum, rhodium, palladium, ruthenium, rhenium and osmium.

16. The process of claim 14 wherein the precious metal comprises platinum.

17. The process of claim 14 wherein the alkaline earth metal is selected from the group consisting of magnesium, barium and calcium.

18. The process of claim 14 wherein the alkaline earth metal comprises magnesium.

19. The process of claim 14 wherein the weight ratio of the precious metal to the alkaline earth metal vanadate is from about 1:1 to about 1:50.

20. The process of claim 14 wherein the ratio of the precious metal to the alkaline earth metal is from about 1:5 to about 1:20.

21. The process of claim 14 wherein the composition of the porous filter substrate is selected from a group of materials consisting of alumina, titania, zirconia, boria, corundum, silica, magnesia, potassium titanate, silica-alumina, silica-zirconia, silicon carbides, titania-zirconia, titania-silica, titania-coated alumina, alumina coated with tungsten oxide, alumina coated with zirconia, cordierite, mullite, and mixtures and combinations thereof.

22. The process of claim 14 wherein the quantity of the catalyst material impregnated on the filter substrate is from about 200 g/ft$^3$ (7.1 g/l) to about 1000 g/ft$^3$ (35.3 g/l).

* * * * *